May 26, 1953

H. E. ROSE ET AL 2,639,491

TRANSFER MACHINE

Filed Jan. 10, 1947

INVENTORS
HOWARD E. ROSE,
EDWIN R. MOTCH, Jr AND
BY DAVID S. BAUS

Oberlin & Limbach
ATTORNEYS.

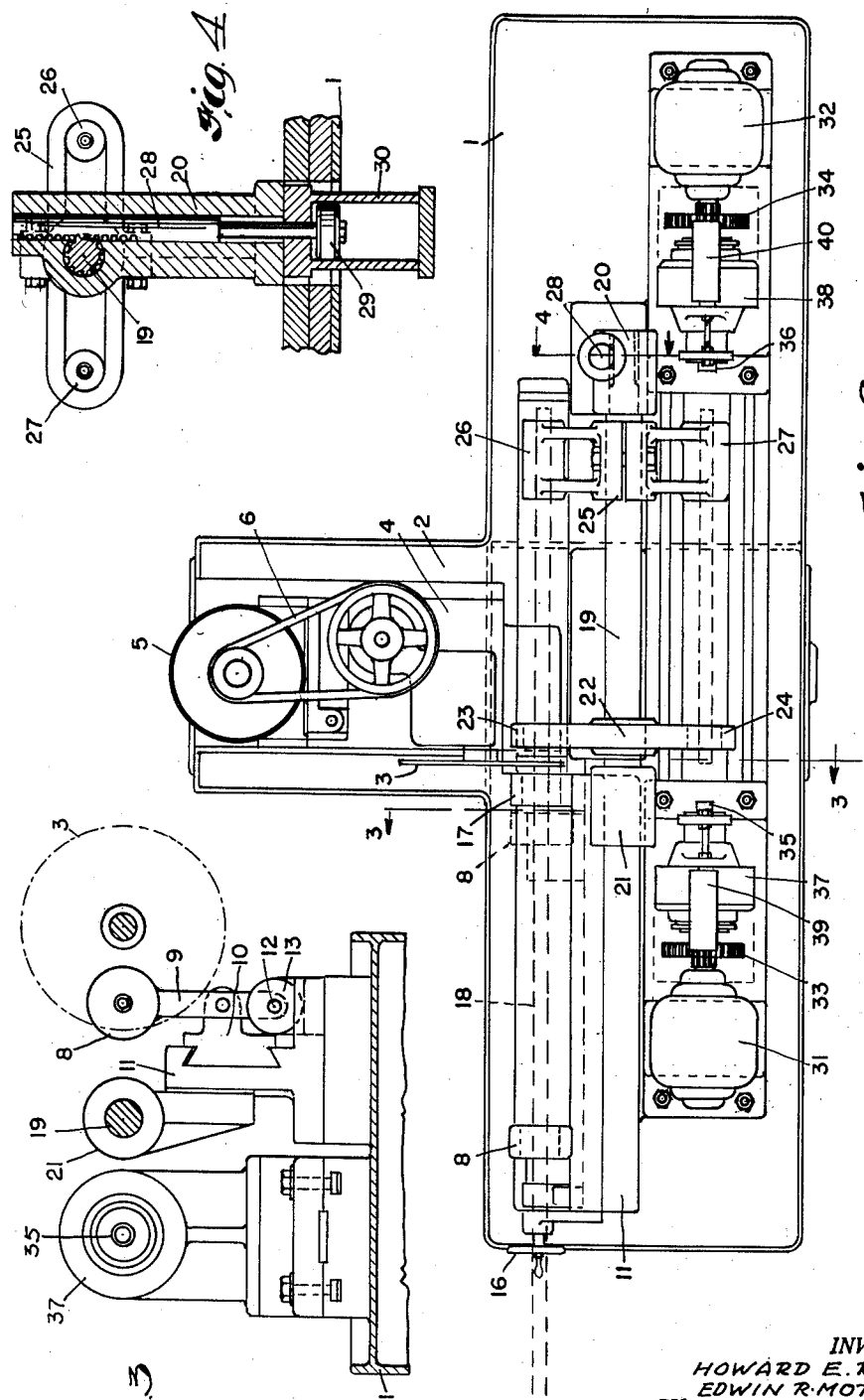

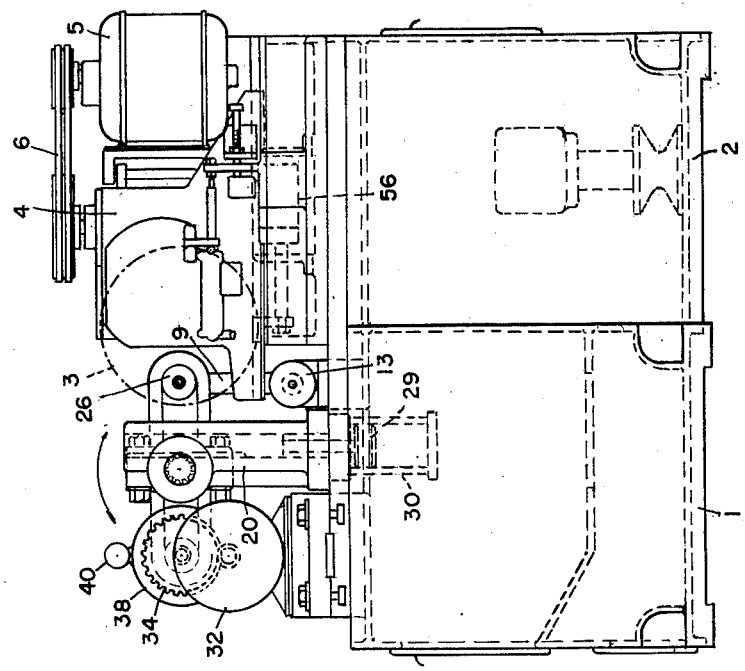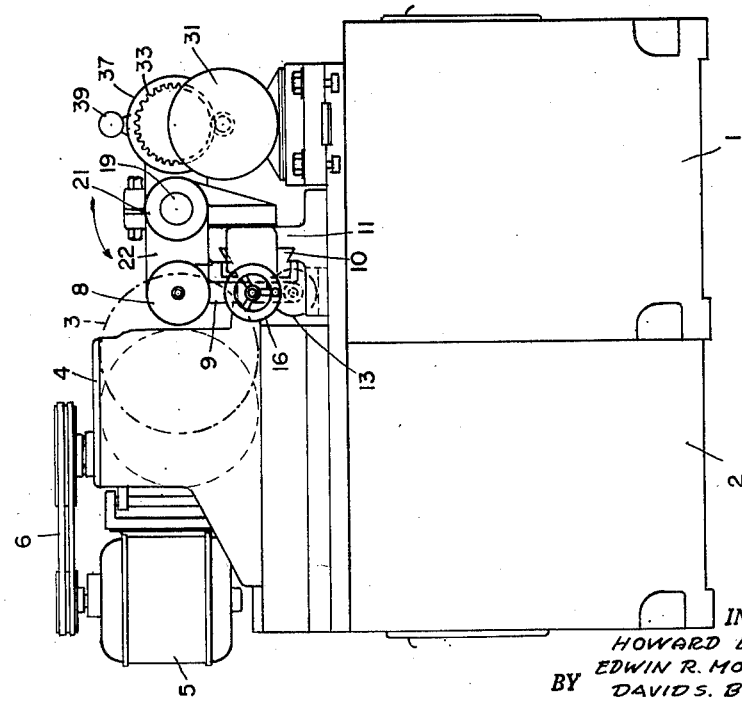

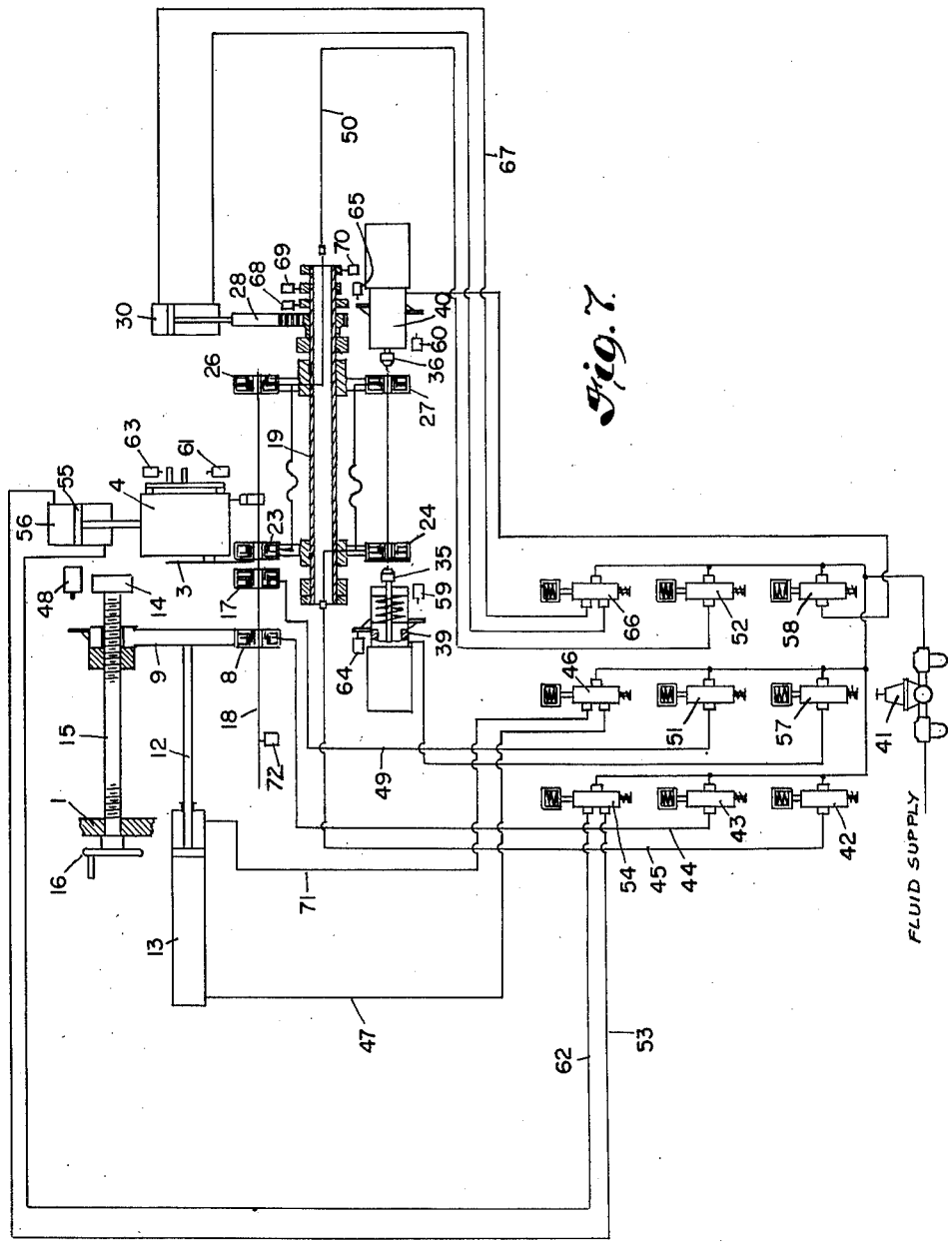

Patented May 26, 1953

2,639,491

UNITED STATES PATENT OFFICE 2,639,491

TRANSFER MACHINE

Howard E. Rose, Peninsula, and Edwin R. Motch, Jr., and David S. Baus, Cleveland, Ohio, assignors to The Motch & Merryweather Machinery Co., Cleveland, Ohio, a corporation of Ohio Application January 10, 1947, Serial No. 721,442

4 Claims. (Cl. 29—33)

1

This invention relates as indicated to a transfer machine, and more particularly to stock transfer mechanism adapted to transfer cut off sections of a continuous length of stock from an automatic sawing machine to another station where a further operation may be performed upon such sections.

Various types of workpiece transfer devices are well known for moving a workpiece from station to station where a number of operations are sequentially performed.

It is an object of the present invention to provide work transfer means particularly adapted to be employed in conjunction with an automatic sawing machine, and which will return the workpiece to such machine for ejection by further feeding of a continuous length of stock to the sawing machine, thereby eliminating necessity for a separate work ejection station while at the same time permitting simultaneous operation of the sawing machine and the tool at the station to which the workpiece is transferred.

A further object of the invention is to provide such means which may be entirely automatic in operation and capable of high unit production.

Other objects and advantages will be apparent as the following description proceeds.

To the accomplishment of the foregoing and related ends, said invention, then, comprises the features hereinafter fully described and particularly pointed out in the claims, the following description and annexed drawings setting forth in detail certain illustrative embodiments of the invention, these being indicative, however, of but a few of the various ways in which the principle of the invention may be employed.

In said annexed drawings:

Fig. 2 is a top plan view of such device;

Fig. 3 is a vertical sectional view taken along the line 3—3 on Fig. 2;

Fig. 4 is a fragmentary vertical sectional view taken along the line 4—4 on Fig. 2;

Fig. 5 is an elevational view of the left end of the machine as shown in Fig. 2;

Fig. 6 is an elevational view of the right end of such machine as shown in Fig. 2;

Fig. 7 is a diagrammatic layout of the fluid pressure means by which the machine is adapted to be automatically operated;

Figure 1:
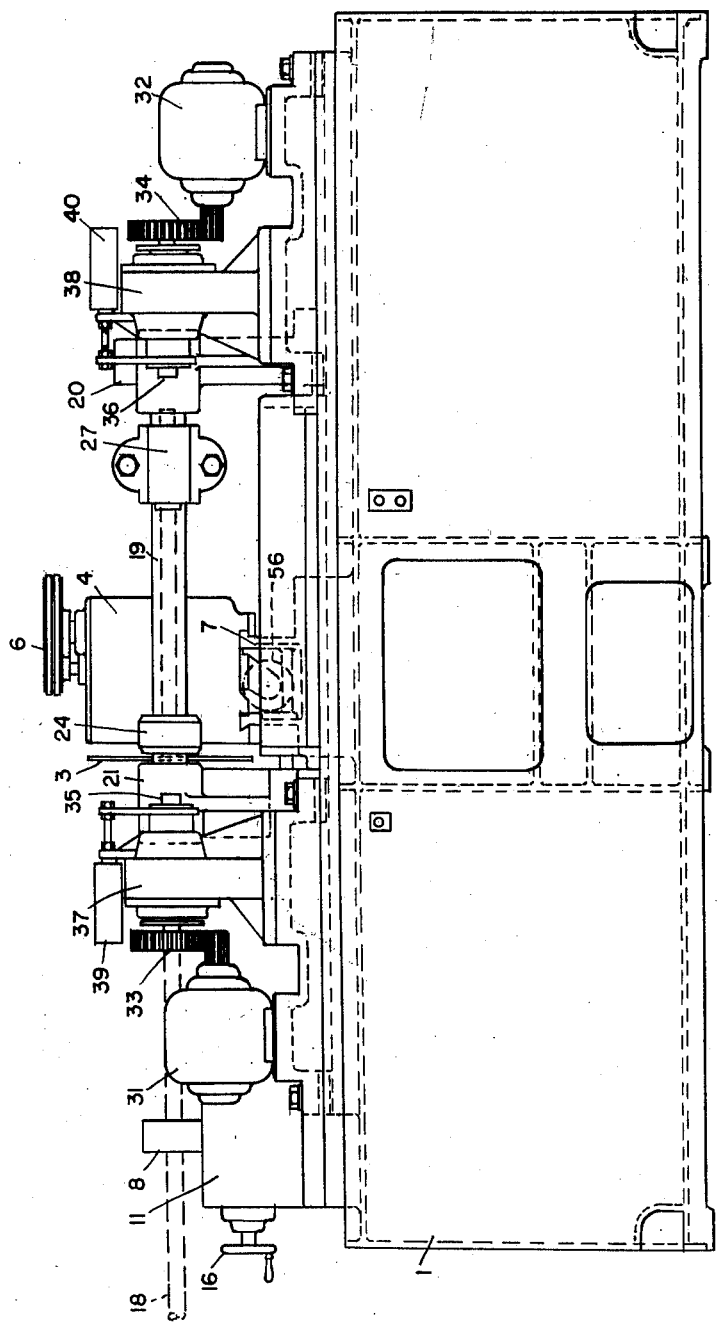
Fig. 1 is a front elevational view of the device of this invention.

Referring now more particularly to such drawings the stock-feeding and transfer mechanism of this invention are supported on a box frame 1 to which is attached the base-frame 2 of a sawing machine of the general type shown and described in Patent No. 2,327,920 to J. G. Moohl. The precise construction of such sawing machine may vary but such machine as shown comprises a rotary disc saw 3 mounted on a carriage 4 adapted to be reciprocated relative to such base-frame 2. The saw is driven by an electric motor 5 pivotally mounted on such carriage for proper tensioning of belt drive 6, through gearing (not shown) within the carriage. The carriage travels on ways 7 on base-frame 2 whereby the saw may be traversed to engage and cut off the work. The manner in which such sawing machine is operated in timed relation to the operation of the stock feeding and transfer mechanisms is explained below.

The stock feeding mechanism is shown to the left of the saw 3 and the transfer mechanism to the right as viewed in Figs. 1 and 2 but such relationship may obviously be reversed, if desired. Such feed mechanism comprises an air chuck 8 carried by a vertically extending member 9 secured to a dove-tail bracket 10 slidably mounted in stand 11. The lower end of member 9 is secured to piston 12 of the stock feed cylinder 13 for reciprocation thereby. Means for gauging the length of stock to be fed is provided in the form of a stop 14 adapted to be adjustably positioned by rotation of threaded shaft 15 and hand wheel 16. The forward movement of piston 12 is thus limited by engagement of an extension of member 9 with such stop, as shown in Fig. 7.

For further details of construction of one form of feed mechanism which may be employed, reference may be had to application for U. S. Letters Patent of Howard E. Rose, Serial No. 714,208, filed December 5, 1946, and now Patent No. 2,589,576, granted March 18, 1952.

A stationary air chuck 17 is mounted on the frame adjacent saw 3 and in alignment with feed chuck 8 to clamp the stock 18 during the sawing operation (see Figs. 2 and 7).

To the other side of saw 3 a shaft 19 is journalled at its two ends in a column 20 and a bracket 21 carried by an extension of stand 11. A cross-arm 22 provided with air chucks or collets 23 and 24 at its respective ends is keyed to such shaft for rotation therewith, adjacent to the saw. An auxiliary cross arm 25 carrying air chucks 26 and 27 is clamped to such shaft and is adapted to be adjustably positioned therealong to accommodate work-pieces of varying lengths. If desired, means may be provided to rotate shaft 19 in the same direction, appropriate indexing means likewise being provided to position the chucks at the desired stations. In the preferred embodiment illustrated, however, means is provided to oscillate shaft 19 and attached arms 22 and 25 through an arc of 180° between the two work stations, as described below. The end of shaft 19 journalled in column 20 is provided with gear teeth adapted to mesh with rack 28 operatively connected to piston 29 in hydraulic cylinder 30. Reciprocation of such piston and rack will therefore rock shaft 19 (see Fig. 4).

Two opposed chamfering units are adjustably mounted on ways to the other side of shaft 19 from chuck 17 for movement toward and away from each other. Such units comprise chamfering heads driven by motors 31 and 32 through reduction gearing 33 and 34 respectively. Such heads comprise tool holding arbors 35 and 36 carried by stands 37 and 38 and adapted to be advanced and retracted by means of air cylinders 39 and 40 respectively. It will be obvious that other than chamfering operations may be performed at this second station, if desired.

Figure 8:
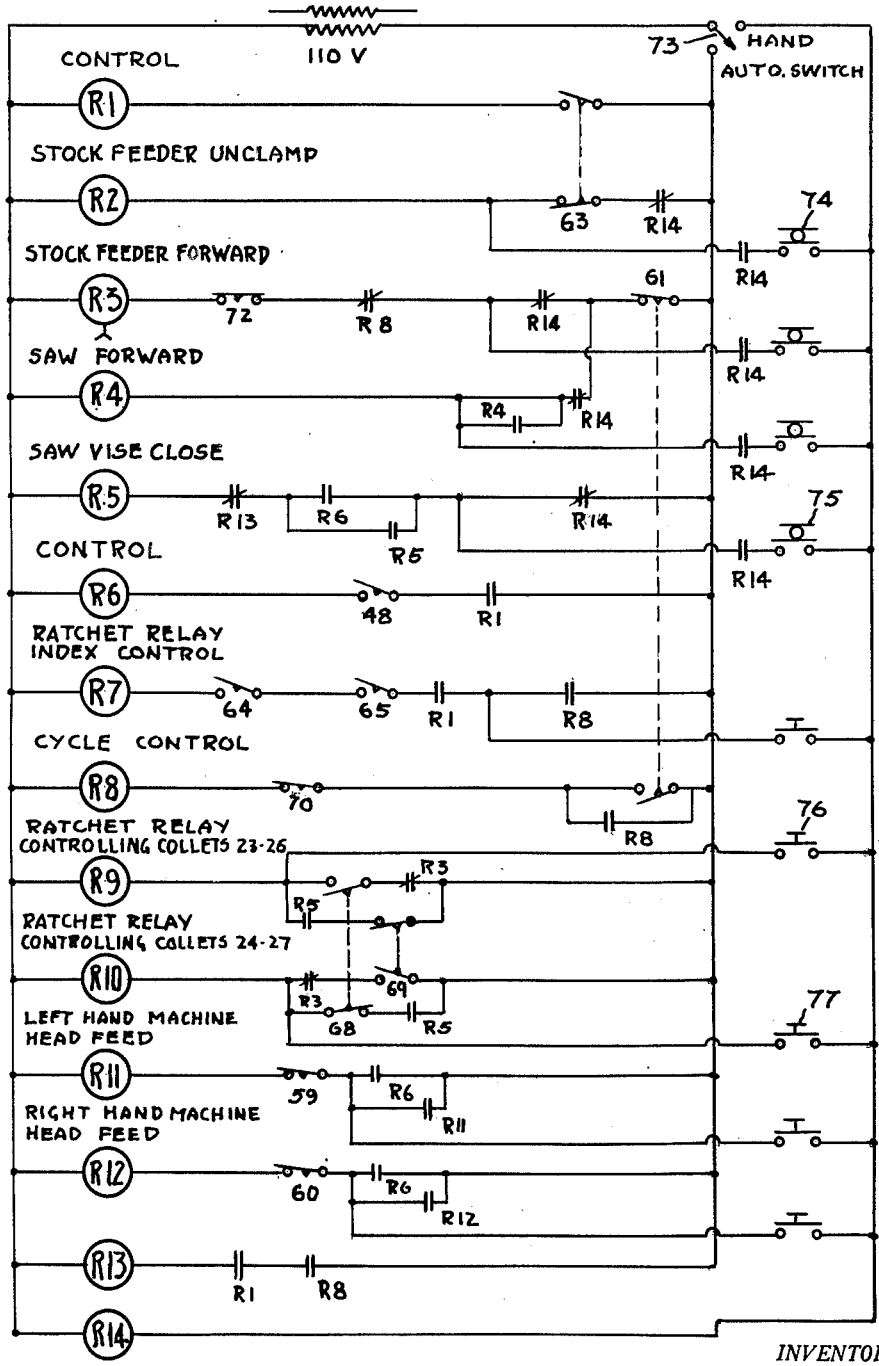
Fig. 8 is an electric wiring diagram of a circuit for controlling such fluid pressure system.

The operation of the above-described mechanism may be best understood by reference to Figs. 7 and 8. To start the machine the operator selects hand operation at the control panel hand-automatic switch 73. He then unclamps collet 8 by closing switch 74, unclamps collet 17 by opening switch 75, and threads a bar of stock 18 therethrough. Such bar is adjusted relative to the saw to take a short squaring-up or cropping cut off the end, first closing switch 75 to close saw vise collet clamp 17. Collets 23 and 26 are now opened and collets 24 and 27 are closed by manual operation of their respective control switches 76 and 77 (the interconnection of the electric control circuits and fluid pressure system will be discussed in greater detail below with regard to automatic operation). Vise 17 is now opened and feeder clamp 8 is closed upon the stock. Saw carriage 4 and machining heads 39 and 40 are returned to their back positions contacting limit switches 63, 64 and 65 respectively, and stock feeder 9 is advanced to its forward position, contacting limit switch 48, and feeding the stock.

The operator now selects "automatic" at hand-automatic switch 73, whereupon relay R5 is energized to operate solenoid controlled valve 51 to admit fluid pressure from supply valve 41 to line 49, thereby clamping saw vise collet 17 on the stock. Ratchet relay R9 is similarly energized to operate valve 52 to admit fluid pressure to line 50, thereby closing transfer collets 23 and 26 on the stock. Saw carriage 4 is advanced as a result of fluid pressure being admitted to line 53 from valve 54 and thereby moving piston 55 in cylinder 56. Machining heads 39 and 40 are advanced toward one another by operation of valves 57 and 58 respectively, such valves being controlled by relays R11 and R12. Valve 54 is controlled by relay R4.

When the advancing saw carriage leaves limit switch 63, the latter will close, completing the circuit through relay R2 which controls solenoid-operated valve 43 and thereby releasing feed collet 8 by connecting line 44 to tank.

When the saw carriage reaches limit switch 61 (having completed the cut) relays R3 and R4 shift valves 54 and 46 respectively, admitting fluid pressure to lines 62 and 71 to return the saw carriage and stock feeder (clamp 8 having been released above). Machining head 39 engages limit switch 59 and head 40 engages switch 60, operating relays R11 and R12 respectively to shift valves 57 and 58 to tank, causing such heads to return and engage limit switches 64 and 65. When the saw carriage has returned, it again engages limit switch 63. Index control ratchet relay R7 is energized by the closing of such limit switches and reverses four-way valve 66, admitting fluid pressure to line 67 leading to cylinder 30. Rack 28 is accordingly reciprocated to rock shaft 19 180° about its axis, bringing collets 23 and 26 bearing the cut-off workpiece into axial alignment with machine spindles 35 and 36, and bringing collets 24 and 27 into alignment with collets 8 and 17.

At the start of such indexing movement, cam-operated limit switch 68 (which has been contacted up to this time) changes position but causes no action in relays R9 and R10. As shaft 19 continues to turn, however, limit switch 70 is momentarily tripped, breaking the circuit to relay R8 and therefore likewise opening relay R13. Opening of relay contacts R13 opens relay R5 with consequent shifting of valve 51 to tank, causing saw vise collet 17 to open. Simultaneously, such switch initiates a time period in time delay relay R3.

When indexing is completed, limit switch 69 is contacted causing a circuit to be made through ratchet relay R10, shifting valve 42 to relieve the pressure in spring-loaded collets 24 and 27 (now aligned with collet clamp 17). Collets 26 and 23, however, remain closed.

The actuation of limit switch 63 above causes relay R2 to shift valve 43 to connect line 44 to tank, whereupon feeder clamp 8 again grips the stock.

The time delay period of relay R3 now elapses, operating solenoid controlled valve 46 to admit fluid pressure to line 47 and connect line 71 to tank, thereby feeding the stock forward through clamp 17 and transfer collets 24 and 27 (and ejecting a finished work-piece from such latter collets after the second cycle). The cycle is then automatically repeated until the end of the stock passing limit switch 72 permits such switch to open, breaking the circuit and stopping the operation.

It will be obvious from the foregoing that the mechanism of this invention is adapted for either automatic or manually controlled operation; also that an operation other than chamfering may be performed at the second work station, if desired. Air or fluid operated chucks or collets are well known in the art, two types being illustrated and described in Walder Patent 2,383,094 and Redmer Patent 2,392,999 respectively.

Other modes of applying the principle of the invention may be employed, change being made as regards the details described, provided the features stated in any of the following claims or the equivalent of such be employed.

We therefore particularly point out and distinctly claim as our invention:

1. In a cut-off and multiple operation machine, an automatic sawing machine, means automatically operative intermittently to feed a continuous length of stock into position to be cut off by the saw of such machine, means automatically operative to clamp such stock during the sawing operation, two chamfering heads spaced laterally from said clamping means and relatively axially spaced to receive a cut-off section of stock therebetween, a longitudinal member pivotally mounted midway of its length about an axis parallel to such stock with its respective ends thereby oscillatable through arcs of 180° between said clamping means and said chamfering heads, air collets on the respective ends of said member adapted to receive and hold the work during the sawing and chamfering operations, and rack and pinion means operative in timed relation to the operation of said feed means to swing said member to transfer a cut-off section of such stock from such sawing machine to chamfering position between said chamfering heads and to return a cut-off and chamfered section from between said chamfering heads to original cut-off position at such sawing machine prior to further feeding of such continuous length of stock, whereby such cut-off and chamfered section will be expelled from the collet holding the same by subsequent further feeding of such continuous length of stock.

2. In a cut-off and multiple operation machine, an automatic sawing machine, means operative intermittently to feed a continuous length of stock into position to be cut off by the saw of such machine, means operative to clamp such stock during the sawing operation, chamfering means spaced laterally from said clamping means, a longitudinal member pivotally mounted intermediate its ends about an axis parallel to such stock with its respective ends thereby oscillatable through arcs of 180° between a station adjacent such clamping means and a station adjacent said chamfering means, chucks on the respective ends of said member operative to receive and hold the work during the sawing and chamfering operations, and means operative in timed relation to the operation of said feed means to swing said member to transfer a cut-off section of such stock from such sawing machine to said chamfering means and to return a cut-off and chamfered section from said chamfering means to original cut-off position at such sawing machine prior to further feeding of such continuous length of stock, whereby such cut-off and chamfered section will be discharged from the chuck holding the same by subsequent further feeding of such continuous length of stock.

3. In mechanism including means operative to feed a length of stock, means operative to cut off sections from the end of such stock, and a second station including means for performing another operation on such cut-off sections simultaneously with the cutting off of successive sections from such length of stock; transfer means operative positively to grip such sections during such cutting off operation, to transfer such cut-off sections to said second station while continuing positively to grip the same, and to return such sections to a position adjacent said cut-off means prior to further feeding of such length of stock, to be ejected from such transfer means by subsequent further feeding of such stock, said transfer means comprising open-end work gripping means mounted for lateral reciprocation between a position aligned with such length of stock in course of being fed to such first cut-off station and an operative position at such second station, and power means operative thus to reciprocate the same.

4. In mechanism including means operative intermittently to feed a length of stock to a first station, means operative to cut off sections from the end of such stock at such first station, and a second station including means for performing a second operation on a section thus cut off; transfer means operative in timed relation to the operation of said feed means to grip such section at such first station during such cut-off operation, then to transfer such cut-off section to such second station for performance of such second operation thereon while continuing positively to grip the same throughout such second operation, and thereafter to return such section to its original operational position at such first station prior to further feeding of such length of stock for ejection from said transfer means by subsequent further feeding of such length of stock, said transfer means comprising two parallel work-gripping devices mounted 180° apart for swinging movement about a common axis between such first station and such second station and adapted alternately to align with such length of stock in course of being fed to such first station, said gripping devices being adapted to permit continued axial travel of a work-piece aligned therewith when not actively gripping the same, and power means operative to swing said two work-gripping devices laterally alternately from such aligned position to such second station and vice versa.

HOWARD E. ROSE.
EDWIN R. MOTCH, Jr.
DAVID S. BAUS.

References Cited in the file of this patent

UNITED STATES PATENTS

| Number | Name | Date |
|---|---|---|
| 1,198,797 | Waterman | Sept. 19, 1916 |
| 1,368,369 | Sykes | Feb. 15, 1921 |
| 1,735,231 | Braren | Nov. 12, 1929 |
| 1,737,208 | Tessky | Nov. 26, 1929 |
| 1,976,113 | Binns | Oct. 9, 1934 |
| 2,030,888 | Morgan | Feb. 18, 1936 |
| 2,242,487 | Swanson | May 20, 1941 |
| 2,351,962 | Harrison | June 20, 1944 |
| 2,376,335 | Braendel et al. | May 22, 1945 |
| 2,376,654 | Braendel et al. | May 22, 1945 |
| 2,383,094 | Walder | Aug. 21, 1945 |
| 2,392,999 | Redmer | Jan. 15, 1946 |
| 2,397,351 | Heintz et al. | Mar. 26, 1946 |
| 2,433,076 | Weckstein | Dec. 23, 1947 |

OTHER REFERENCES

Ser. No. 370,079, Kohring (A. P. C.), published Apr. 27, 1943.